Aug. 19, 1958   W. T. HARRIS   2,848,672
SELF-EXCITED TRANSDUCER
Filed July 26, 1955   2 Sheets-Sheet 1
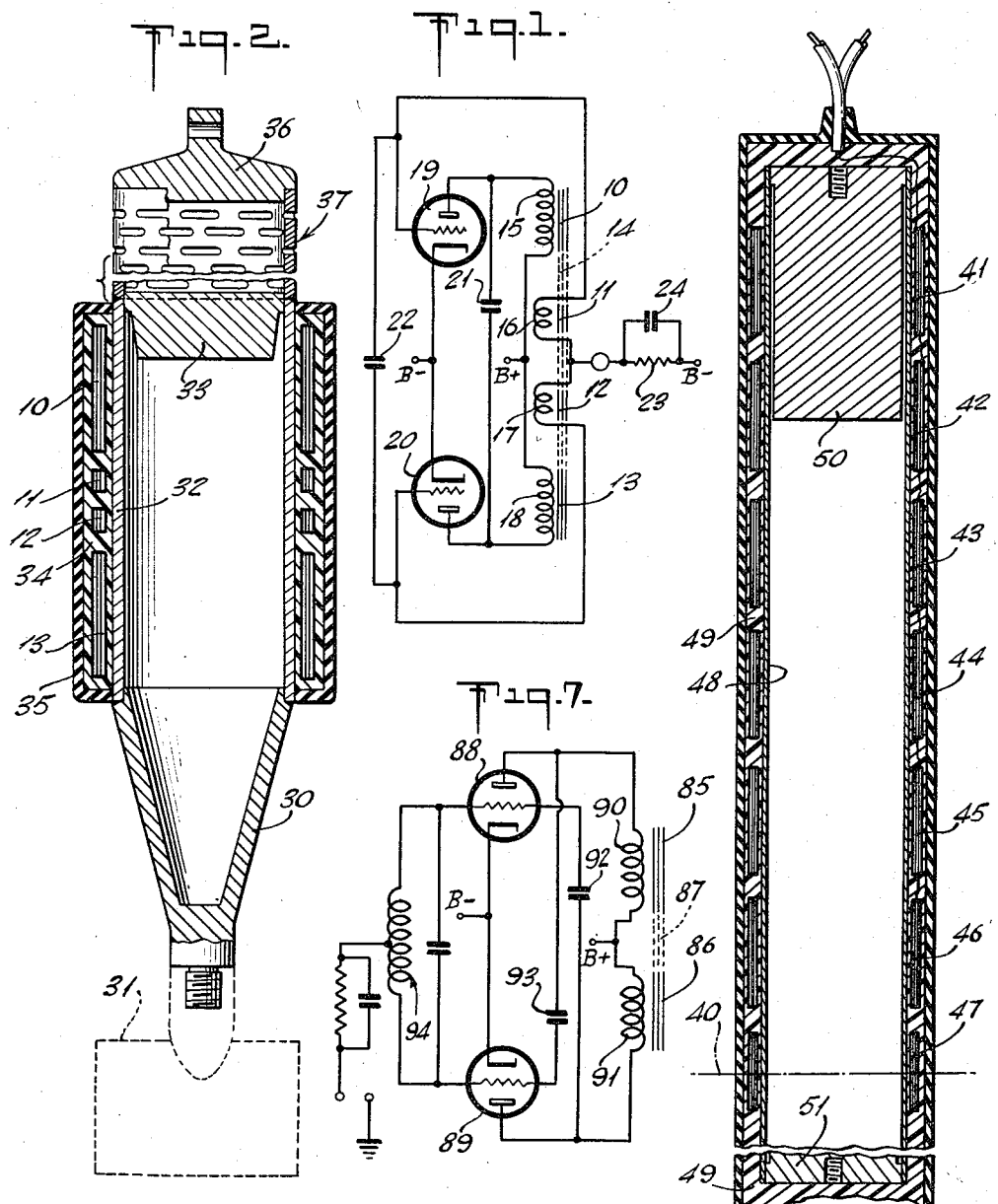
INVENTOR
WILBUR T. HARRIS
BY
ATTORNEYS Aug. 19, 1958      W. T. HARRIS      2,848,672
SELF-EXCITED TRANSDUCER
Filed July 26, 1955      2 Sheets-Sheet 2
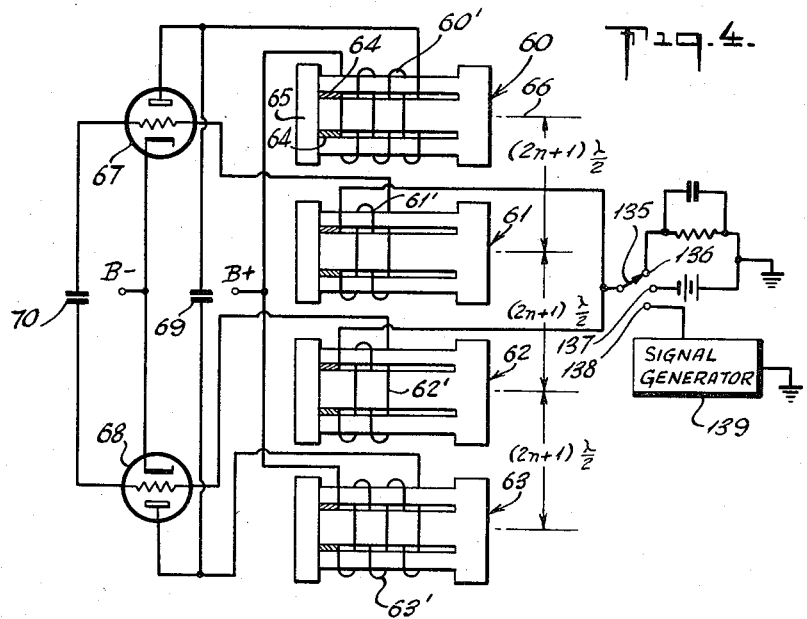
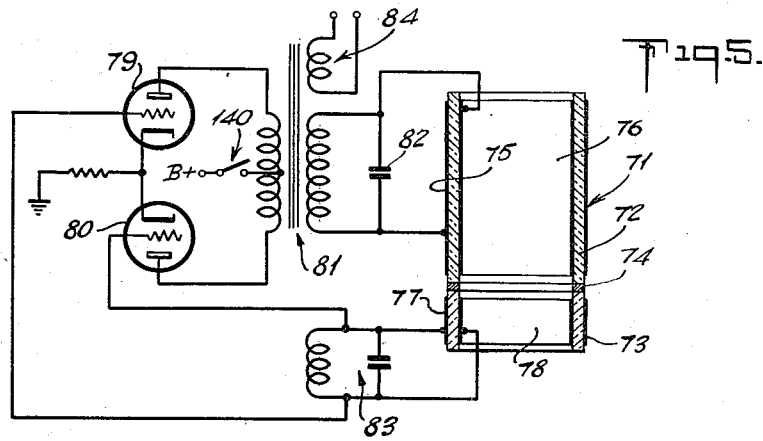
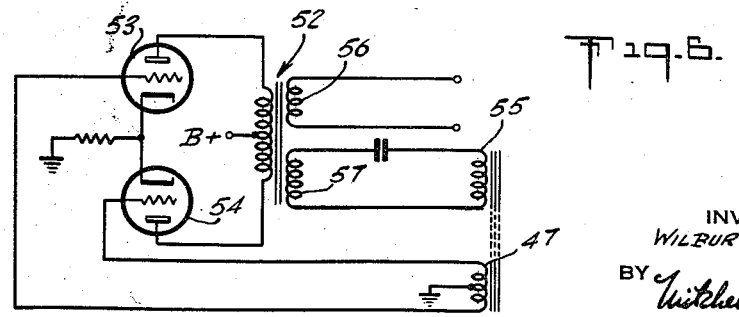
INVENTOR
WILBUR T. HARRIS
BY
ATTORNEYS

United States Patent Office 2,848,672
Patented Aug. 19, 1958

2,848,672

SELF-EXCITED TRANSDUCER

Wilbur T. Harris, Southbury, Conn., assignor to The Harris Transducer Corporation, Woodbury, Conn., a corporation of Connecticut Application July 26, 1955, Serial No. 524,545

11 Claims. (Cl. 318—118)

My invention relates to electromechanical transducers, and in particular to self-excited transducers and to transducer and circuit combinations involving the excitation of the transducer itself. By self-excitation is meant that the transducer itself is the resonant-energy-storing device and principal circuit element and that the transducer itself determines the frequency of the electrical-oscillator current which powers the transducer.

It is a general object to provide transducers of the character indicated, and to provide circuit connections therefor, whereby the number of necessary circuit elements is reduced to a minimum, and whereby utmost use is made of the energy-storing properties of the transducer itself.

It is a specific object to meet the above object with constructions which do not require a transformer.

It is another object to meet the above objects with structures which optimize the advantages of combined electrical push-pull and mechanical push-pull operation.

Other objects and various further features of novelty and invention will be pointed out or will occur to those skilled in the art from a reading of the following specification in conjunction with the accompanying drawings. In said drawings, which show, for illustrative purposes only, preferred forms of the invention:

Fig. 1 is an electrical circuit diagram schematically showing a transducer of my invention combined with an electrical circuit;

Fig. 2 is a partly broken away longitudinal sectional view of a vibratory machine tool incorporating features of the invention;

Fig. 3 is a partly broken-away longitudinal sectional view of an underwater acoustic transducer incorporating features of the invention; and Figs. 4 to 7 are electrical diagrams illustrating alternative transducer and circuit arrangements.

Briefly stated, my invention contemplates transducers and circuits involving self-excitation of the transducer, meaning that the transducer itself is relied upon as the primary resonant energy-storing device and as the principal circuit element determining the frequency of the electrical oscillator current which powers the transducer. Generally speaking, my self-excited transducers comprise single unitary mechanically resonant structures with at least two electrically independent connections thereto. The electrical connections are separately made to the input and to the output of an electric amplifier in such way that one of the connections provides regenerative feedback to the amplifier. Thus, the more the input energy to the transducer at or near mechanical resonance, the more the positive feedback, and so on, to the limit of power-handling capacity of the amplifier. I preferably provide sufficient pluralities of electrically independent transducer elements, appropriately positioned (and electrically connected) with regard to the local oscillatory phase of the mechanically resonant structure, to assure mechanical push-pull and electrical push-pull operation.

For magnetostrictive systems requiring polarization current, I utilize separate magnetostrictive elements in the mechanically resonant structure, said elements having positive and negative magnetostrictive constants, respectively, so that the system may lend itself to the advantages of push-pull operation. While the invention is applicable to magnetostrictive systems requiring polarization current, I also describe application to permanently polarized magnetostrictive systems, to electromagnetic or variable-position motor systems, and to piezoelectric systems. I further describe how keying or other modulations may be simply applied to govern transducer performance.

Referring to Fig. 1 of the drawings, my invention is shown in application to a single mechanically resonant structure which, for purposes of the schematic diagram, may be assumed to be longitudinally mechanically resonant. The structure comprises a plurality of axially aligned transducer-core elements, such as magnetostrictive cores 10—11—12—13. These cores may be physically separate, but are mechanically bonded so as to create a mechanically unitary structure. Bonding is schematically designated by dashed connections between cores, as at 14 between the cores 10—11. Electrical connections to the transducer elements 10—11—12—13 are preferably independent. Thus, winding 15 is coupled only to core 10, winding 16 to core 11, winding 17 to core 12, and winding 18 to core 13.

At longitudinal resonance, the composite transducer 10—11—12—13, with bonding means 14, will resonate as a half-wave device, meaning that opposite ends are out of phase. I prefer that driving connections be made to the opposite ends and have provided an amplifier of the push-pull variety, comprising two vacuum-tube sections 19—20, the plate or output circuits of which are connected in balanced relation to the outer windings 15—18 in series. Feedback energy for producing self-excited or regenerative action in the amplifier 19—20 is derived from windings 16—17 coupled to cores 11—12 centrally of the half-wave resonator; these feedback connections are preferably balanced and are shown applied to the grid circuits for tubes 19—20. Trimming capacitors 21—22 serve for electrical tuning of the input and output circuit connections, as will be understood. A grid-current resistor 23 and by-pass capacitor 24 are shown connected between the series feedback windings 16—17.

For the circumstance in which the cores 10—11—12—13 are of the permanently magnetized variety, it is merely necessary that appropriate attention be given to the polarity of winding connections to the input and output circuits of the amplifier to assure regenerative feedback upon excitation. However, for the circumstance in which cores 10—11—12—13 are not permanently magnetized, I require a special relationship of magnetostrictive constants in order to assure that polarizing currents may not be neutralized; specifically, for any particular half of the mechanical push-pull system, I require that the magnetostrictive constants shall be of opposite sign. Thus, the core 10 may be an alloy of iron and nickel, iron and aluminum, or iron and cobalt, all characterized by a positive magnetostrictive coefficient; whereas, the core 11 may be of pure nickel and thus exhibit a negative magnetostrictive coefficient.

Since the other half of the system for the case of a half-wave resonator will be operating in inverted phase relation with the half comprising cores 10—11, it is necessary to invert the disposition of the sign of the magnetostrictive constant for said other half. Thus, for the situation in which the upper driver core 10 has the positive magnetostrictive constant as described above, the lower driver core 13 should exhibit a negative magnetostrictive constant, as by making the core 13 of pure nickel. Similarly, the core 12 should be of opposite sign and may, for the situation described, be of one of the iron alloys noted.

I prefer that the magnetostrictive elements 10—11—12—13 shall be of substantially equivalent mechanical properties and thus prefer to use annealed commercially pure nickel for the cores (11—13) having the negative magnetostrictive constant, and to use an iron alloy of the type known as vanadium permendur (49% Fe, 49% Co, 2% V) for the cores (10—12) having positive magnetostrictive coefficients. For this choice of materials, approximately electrically equivalent windings may be developed (as for use in the push-pull system described) if the nickel laminations are substantially one-half the thickness of the vanadium permendur laminations, and the numbers of turns adjusted approximately inversely as the square roots of the permeabilities of the cores.

Fig. 2 illustrates a particular application of a transducer as described in connection with Fig. 1, the application being to a vibratory machine tool for supporting, at one end of a horn or cone 30, a lapping tool or the like 31. The cone 30 is shown carried at one end of an elongated cylindrical support 32, and a counterweight 33 is carried at the other end of the tubular support 32. The driver cores 10—13 surround the support tube 32 at the longitudinal ends thereof, and the pick-off or feedback cores 11—12 surround central parts of the tube 32. Cores 10—11—12—13 are preferably bonded to each other and to the tube 32, as by casting in a body 34 of hard plastic.

The suspension and action of cores 10—11—12—13 on the tube 32 is one of what I term Poisson's ratio squeezer coupling, all as more fully set forth and described in my copending application Serial No. 508,074, filed May 13, 1955. It suffices to say that, on excitation of one of the cores, say the core 13, the accompanying radial contraction of the core 13 squeezes and tends locally to elongate the core 32. The phasing of squeezing actions at driver cores 10—13 is such as to effect simultaneous squeezing at both ends so that all forces tending to elongate the tube 32 act simultaneously, and the tube including cores 10—11—12—13 and body 34 tends to resonate longitudinally as a single half-wavelength resonator, loaded at opposite longitudinal ends by the tool and cone 30—31 and by the counterweight 33. When the resonant tool of Fig. 2 is connected to electrical circuitry of the type shown in Fig. 1, the regenerative feedback from the pickoff elements 11—12 will cause amplifier means 19—20 to excite driver elements 10—13 to capacity, and resonance will be dominated and determined by the energy stored in the mechanically resonant structure.

To complete the structure, an outer boot of rubber or rubber-like material 35 is shown for protection purposes. Handling is facilitated by employment of a mounting member or adapter 36 connected by compliant means 37 to the longitudinal end of tube 32 remote from the tool 31. The compliant connecting member 37 may be a tube having circumferentially extending slots, interlaced to yield longitudinally and thus to isolate the mount 36 from the longitudinally resonant structure.

In Fig. 3, I show application of my invention to an elongated cylindrical transducer of the type useful in underwater-sound applications, as, for example, one element of an array for which radial response, i. e., response in the radial plane 40 extending normal of the central part of the transducer, is of importance. The construction, nevertheless, generally resembles that described in connection with the tool of Fig. 2, in that a plurality of core elements 41—42—43—44—45—46—47 is distributed along the length of a supporting tube 48, and all core elements are bonded integrally to the tube 48 and to each other by means of a hard plastic 49. Counterweight means 50—51 at the longitudinal ends of tube 48 serve to lower the frequency of mechanical resonance for a given limiting size; viewed from another aspect, counterweights 50—51 serve to reduce the required size, for operation at a given frequency. The elements 41 . . . 46 may be drivers and are provided in plurality, rather than as a single element, because I find that Poisson's ratio squeezer action is more pronounced with such an arrangement. The individual windings for the driver cores 41 . . . 46 may be connected in series to define a single driver unit for one longitudinal half of the half-wave resonant structure, and in like manner a corresponding series-connected set of windings may define the driver unit at the other longitudinal end. Electrically independent pick-off or feedback winding means may be developed on a single, longitudinally centrally located core element 47.

The driver and pick-off units of Fig. 3 may be connected as described for the case of Fig. 1, but I illustrate in Fig. 6 the employment of a transformer 52 serving as a means for balanced connection of the output of amplifier 53—54 to all signal windings in series, said windings being shown in Fig. 6 by the general designation 55. The winding 47 used for feedback purposes may be connected in balanced relation to the input circuits of amplifier 53—54. In the event that independent electrical output reflecting transducer action is desired, an additional secondary winding 56 may be provided for the transformer 52, said winding 56 being electrically independent of the secondary winding 57 serving the driver windings 55. Such output signal is then directly available from the terminals of winding 56.

Fig. 4 illustrates the use of a self-excited array of laminated-stack-type magnetostrictive transducers in an arrangement suitable for sonic cleaning; however, mechanical push-pull coupling is established via the liquid medium, rather than by bonding as in Figs. 1–3. The individual transducer elements may be of the variety described at greater length in my copending application Serial No. 475,462, filed December 15, 1954. Suffice it to say that each of the transducers 60—61—62—63 comprises a stack of multiple-leg laminations, as of the three-legged variety shown. Permanent-magnet inserts 64 close the open ends of the three-legged cores, and counterweight means 65 is bonded to and carried by the end closed by the permanent-magnet elements 64. Each transducer element may be said to have a primary longitudinal response axis, such as the axis 66 for transducer 60. These response axes are preferably parallel to each other and are laterally spaced by an amount representing an odd number of half-wavelengths at the resonant frequency in the liquid medium, reliance being had on coupling through the medium itself to establish phase inversion from one transducer element 60 to the next 61, thereby obviating any need for magnetostrictive constants of opposite sign; similar spacings apply between axes of transducer elements 61—62, and 62—63, as will be understood.

For the array shown, I indicate my preference for connecting the output of amplifier means 67—68 directly to the two windings 60'—63' for the outer or driver transducer elements, said connection being balanced. In like manner, the windings 61'—62' for the center or feedback elements are connected in series and are balanced to the input or grid circuits for the amplifier means 67—68. Tuning capacitors 69—70 permit electrical tuning to the mechanically resonant frequency established by liquid coupling of adjacent transducer elements, so that in operation the device functions analogously to the operation described for Fig. 1, the principal storage of energy being accomplished in the mechanical system comprising elements 60—61—62—63 and the fluid medium in which said elements are immersed.

In Fig. 5, I illustrate application of the principles of my invention to a piezoelectric transducer 71 which may comprise essentially a single elongated member of piezoelectric ceramic, but, which in the form shown, comprises first and second sections 72—73 of matching cross-section, integrally mechanically bonded at 74 so as to constitute a single mechanically resonant structure. A first pair of electrodes 75—76 provides electrical connection to the driving end of the transducer, and a second pair of electrodes 77—78 provides electrical pick-off for feedback purposes. The amplifier 79—80 is again preferably of the push-pull variety, and balanced output connections to the driver electrodes 75—76 include transformer means 81 and an electrical tuning element 82. Balanced feed-back connections to the input or grid circuits for amplifier 79—80 include a tank circuit 83. Again, for external availability of an electrical signal reflecting transducer performance, I show auxiliary secondary winding means 84 as a part of the transformer 81.

The circuit of Fig. 7 illustrates a modified electrical employment of the principles of my invention, in which the transducer happens to be of the magnetostrictive variety. The magnetostrictive structure is suggested by first and second core elements 85—86 bonded or otherwise coupled mechanically by means 87 to provide a mechanically resonant structure in which resonant energy may be stored for self-excitation purposes. Again, I show a push-pull amplifier 88—89 having an output circuit connected in balanced relation to the windings 90—91 for cores 85—86. The magnetostrictive constants of cores 85—86 are preferably of opposite sign, should the device not be of the polarized variety. The regenerative feedback is accomplished electrically by capacitative couplings 92—93, and a tank circuit 94 across the input is provided for tuning the electrical parts to the mechanically resonant frequency and for thus improving the overall "Q" of the device.

It will be seen that I have described improved transducer and transducer-circuit arrangements, whereby reliance may be had primarily on the transducer itself for storage of excitation energy, so that provision of storage circuitry is not a significant requirement. My mechanisms make possible utmost economies, flowing from push-pull operation both in the electrical circuits and in the mechanical utilization of the transducer. Economies are also realized in substantial reduction of requirements for tubes and transformers, as compared with conventional systems of equivalent capacity.

In spite of the delegation of energy-storing functions to mechanical parts of the system, control is not thereby sacrificed. Control may be effected in either the input or the output circuit; for example, in Fig. 4, switch means 135 will be understood to designate means by which a self-excited transducer may be keyed at the input circuit, keying being accomplished between a grid-leak terminal 136 and a cut-off bias terminal 137. Alternatively, placement of switch arm 135 at terminal 138 establishes connection to means 139 for otherwise modulating the transducer at resonance. In Fig. 5, key means 140 in the B-supply connection will be understood to suggest keying or other modulation effected by control of the output circuit of the amplifier.

While I have described the invention in detail for the preferred forms shown, it will be understood that modifications may be made within the scope of the invention as defined in the claims which follow.

I claim:

1. An electromechanical transducer, comprising an axially aligned array of separate elongated toroidally wound magnetostrictive ring members, said ring members having different magnetostrictive constants and being mechanically bonded so that a single mechanical structure including said ring members may resonate.

2. In combination, an elongated cylindrical transducer comprising an axially aligned array of independent toroidally wound magnetostrictive elements, two adjacent of said elements having magnetostrictive constants of opposite sign, an electrical amplifier having an output circuit connected to the winding for one of said two elements, and a feed-back circuit connecting the winding for the other of said two elements to the input of said amplifier.

3. In combination, an electromechanical transducer comprising an elongated cylindrical mechanically resonant structure including four axially spaced independent toroidally wound magnetostrictive cores, adjacent of said cores being of opposite magnetostrictive constant, a push-pull electrical amplifier including balanced output connections directly to two of the windings on cores of magnetostrictive constant of opposite sign, and balanced feed-back connections from the other two windings to the input of said amplifier.

4. The combination of claim 3, in which the axially outer two cores are of substantially greater elongation than the axially inner two cores, and in which output connections are made to the windings for the outer cores.

5. A machine tool comprising an axially aligned array of elongated toroidally wound cylindrical magnetostrictive transducer elements mechanically bonded to each other and having independent electrical connections thereto, an elongated tubular mechanical support axially overlapping said transducer elements and continuously bonded thereto, whereby said tubular support may undergo changes in axial length upon application of electrical energy to said electrical connections, tool-holding means mechanically bonded to one end of said array and counter-weight means mechanically bonded to the other end of said array.

6. A tool according to claim 5, and including a mechanical support, and a longitudinally yieldable connection from said support to the counterweighted end of said tool.

7. A tool according to claim 5, and an electrical driving circuit therefor, comprising an amplifier with an output directly coupled to one of said electrical elements, and a regenerative feed-back connection from another of said electrical elements to said amplifier.

8. An electromechanical transducer comprising an elongated cylindrical array of axially spaced independent toroidally wound magnetostrictive cylinders, an elongated tubular member axially overlapping all said cylinders, a potting of sound-transmitting material continuously bonding all said cylinders into a single unitary cylindrical mechanically resonant structure including said tubular member, one of said cores having a magnetostrictive constant of sign opposite to the sign of the magnetostrictive constant of a plurality of other cores, the cores of said plurality being electrically connected in series and electrically independent of the winding of said one core.

9. An electromechanical transducer comprising an elongated tubular support, counterweight means at opposite ends of said support and loading said elements for longitudinal resonance, a plurality of independently wound magnetostrictive cylindrical cores axially spaced outside of and along the length of said support, means mechanically bonding all said cores to said support, one of said cores having a magnetostrictive constant of sign opposite to the sign of magnetostrictive constant for a plurality of said cores, the windings for the cores of said plurality being connected in series and electrically independent of the winding for said one core.

10. The transducer according to claim 9, in which said one core is located substantially at the longitudinal center of said transducer, and in which said plurality of cores is distributed symmetrically with respect to said one core and along the length of said support extending both directions to the longitudinal ends thereof.

11. The combination according to claim 3, in which said amplifier includes keying means in one of said connections.

(References on following page)

References Cited in the file of this patent

UNITED STATES PATENTS

| | | |
|---|---|---|
| 1,693,806 | Cady | Dec. 4, 1928 |
| 1,866,267 | Nicolson | July 5, 1932 |
| 1,966,446 | Hayes | July 17, 1934 |
| 2,101,272 | Scott | Dec. 7, 1937 |
| 2,540,412 | Adler | Feb. 6, 1951 |
| 2,571,019 | Donley et al. | Oct. 9, 1951 |
| 2,572,313 | Burns | Oct. 23, 1951 |
| 2,573,168 | Mason et al. | Oct. 30, 1951 |
| 2,594,841 | Arndt | Apr. 29, 1952 |
| 2,638,577 | Harris | May 12, 1953 |
| 2,713,127 | Harris | July 12, 1955 |
| 2,736,144 | Thatcher | Feb. 28, 1956 |